United States Patent [19]

Rolle

[11] Patent Number: 5,674,108
[45] Date of Patent: Oct. 7, 1997

[54] METHOD FOR REMOVING COATINGS WHICH CREATE HAZARDOUS BYPRODUCTS

[75] Inventor: Thomas E. Rolle, Dubuque, Iowa

[73] Assignee: Nextec, Inc., Dubuque, Iowa

[21] Appl. No.: 322,252

[22] Filed: Oct. 12, 1994

[51] Int. Cl.⁶ ............................................. B24B 1/00
[52] U.S. Cl. ........................... 451/38; 451/39; 451/88; 451/87
[58] Field of Search ....................... 451/38, 39, 40, 451/37, 75, 87, 88, 90

[56] References Cited

U.S. PATENT DOCUMENTS

| | | |
|---|---|---|
| 4,125,969 | 11/1978 | Easton . |
| 5,185,184 | 2/1993 | Koran et al. ............................ 451/38 |
| 5,266,122 | 11/1993 | Rapp et al. ............................ 451/38 |
| 5,283,990 | 2/1994 | Shank, Jr. ............................ 451/38 |
| 5,384,990 | 1/1995 | Spears, Jr. ............................ 451/38 |
| 5,412,910 | 5/1995 | Woodson et al. ..................... 451/38 |
| 5,433,659 | 7/1995 | Friess ................................... 451/38 |

*Primary Examiner*—Eileen P. Morgan
*Attorney, Agent, or Firm*—Titus & McConomy

[57] ABSTRACT

A method for removing a coating on a surface by applying a treatment layer to the coating to be removed. The treatment layer is made up of (i) a first material selected from the compounds of sodium and potassium silicates, sodium and potassium phosphate, calcium silicate, iron and aluminum sulfates and (ii) an alkali metal salt. An abrasive is injected against the coating to be removed so that the treatment layer and coat to be removed are removed and any hazardous material in the layer to be removed is contained.

9 Claims, No Drawings

METHOD FOR REMOVING COATINGS WHICH CREATE HAZARDOUS BYPRODUCTS

FIELD OF THE INVENTION

The present invention relates to a method for removing coatings from metals and non-metals and, in particular, to method for removing coatings which includes hazardous waste byproducts.

BACKGROUND OF THE INVENTION

It is generally well known that in removing coatings from metals and nonmetals that various hazardous and toxic wastes are generated. This is especially the case in the abrasive removal of paint coatings such as the sand blasting of lead-based painted steel structures. The U.S. Environmental Protection Agency has included many of the ingredients of coatings, such as heavy metals as hazardous substances which become regulated waste material when removed and then regulated. These wastes include heavy metals such as chromium, silver, lead, arsenic, barium cadmium, selenium, mercury, zinc and others as well as polyvinyl chlorides, PCP, 2BHC and like toxics.

In many of the known removal processes, the hazardous substances create troublesome disposal and handling problems. Consequently, various types of containment systems have been devised to capture the waste and separate it from the hazardous waste components. For example, vacuum recyclable abrasive blasting systems provide a closed loop in which a standard positive pressure or non-pressure blasting pot and venturi injector are used. Typically, steel shot or iron shot are used as the operative abrasive. A negative pressure or vacuum is applied to a hose positioned against the surface on which the coating to be removed is located and which collects the spent abrasive and removed coating prior to exposure to the atmosphere. The collected wastes and reusable abrasives are separated through known separation techniques which are both time consuming and expensive.

Nonvacuum removal techniques require the containment, either full or partial of the surface to be de-coated and the collection of the spent abrasive and removed coating. Again separation of the reusable abrasive and waste components must be effected using standard techniques at a not insubstantial cost. In both methods disposal of the separated waste is a significant problem.

Accordingly, it is an object of the present invention to provide a method for removing coatings, especially those whose wastes will include hazardous substance, which is both effective in use and in cost. It is a further objective of the invention to provide a method which facilitates compliance with the requirements of the various agencies regulating environmental exposure to hazardous substances. It is a further objective to provide a removal method which facilitates the handling and disposal of any hazardous waste in a manner which renders it exempt from regulation.

SUMMARY OF THE INVENTION

Generally, the present invention provides a method for the removal of coatings and surface materials from metals and nonmetal surfaces. In one embodiment, the method comprises applying a treatment layer to the surface coating to be removed prior to removal. In another embodiment, the treatment layer can be applied with the abrasive removal means which aids in dust control. The treatment layer preferably comprises at least one compound selected from the group of silicates, phosphates, sulfates and like materials and an alkaline metal salt. The treatment layer is applied to a thickness of from about 1 mil to approximately 40 mils at a viscosity of 75 to 640 stormer seconds. It has also been found desirable to add a buffering agent to the treatment layer.

The treatment layer is abrasively removed together with the coating or surface sought to be removed. Generally, any type of removal equipment can be used including scrapers, brushes, automatic preparation and removal systems. The treatment layer can be either dry or wet during removal, however, it is preferred that it contain a residual moisture to enhance control of any dust.

In the process of removal, it is desirable to add a compound used in the treatment layer to the raw abrasive feed stock so that the coating removed is admixed with the constituents of the treatment layer prior to containment and separation to assist in dust abatement. During containment and separation, the reusable abrasive is separated from the mixture of treated waste coating/treatment layer prior to such separation process. The added compound can also comprise a combination of the chemicals used for the treatment layer and depends upon the composition of the coating to be removed.

In the process of mechanical separation, the reusable abrasive is coated with constituents from the removed treatment layer. This coating encapsulates the abrasive prior to reuse and is effective when the abrasives is introduced into the removal process to contain or fix fugative dust that may be transported back into the blasting system.

The process of the present invention facilitates the removal and separation of the hazardous waste from the surface coating. More importantly, the invention provides an easy disposal process since the hazardous material is ready for land disposal without further chemical treatment. Other advantages of the present invention will become apparent from a perusal of the following description of presently preferred embodiments of the invention.

PRESENTLY PREFERRED EMBODIMENTS

The presently preferred embodiment of the invention comprises applying to the surface coating to be removed a treatment layer made up of at least one compound selected from the group comprising:

| | |
|---|---|
| Sodium Silicate | Diammonium Phosphate |
| Sodium Metasilicate | Diacalcium Phosphate |
| Sodium Orthosilicate | Dipotassium Phosphate |
| Potassium Silicate | Tricalcium Phosphate |
| Aluminum Sulfate | Trisodium Phosphate |
| Alum | Sodium Metabisulfite |
| Ferrous Sulfate | Metallic Iron |
| Ferric Sulfate | Silicate of Soda |
| Tricalcium Silicate | Soda Ash (Sodium Carbonate) |
| Dicalcium Silicate | Caustic Potash (Potassium) |
| Tricalcium Aluminate | Hydroxide) | and an alkaline metal salt such as aluminum, ferrous or other metal carbonate, silicate or bicarbonate. The ratios of first compound to alkaline metal salt is normally dependent upon the coating to be removed. Set forth below is an illustrative example of a preferred treatment process.

Example

A. Preferably, 3 oz of standard tap water or 3 oz of Sodium Silicate (Grade 42 Ratio 3.23). This is the preferred binder for the treatment layer which is used to bond together the components and to attach the treatment layer to the surface that is to have coating removed. There are different grades and ratios or sodium silicate and the set time can differ considerably between them. Thus, the grade to be used depends on what needs to be accomplished on the surface, e.g., chemicals to dry or to stay moist. It also depends on the type of blasting or removal equipment is to be used.

B: 2 oz of potassium silicate or sodium metasilicate or sodium orthosilicate is mixed with A. These are main component treatment layer chemicals, and each can be applied dry or wet.

C: Also useful as part of the treatment layer is one or more of 1.1 oz of tricalcium silicate, 0.4 oz of Dicalcium silicate, 0.16 oz of tricalciumaluminate, 0.20 oz of ferrite solide, 0.14 oz of magnesium oxide. These chemicals can be applied either in the dry or wet.

Also available are commercially available waste stabilization compounds. These can be used in the preparation and storage of the treatment layer.

In certain applications it is desirable to include a buffering agent such as magnesium oxide, magnesium hydroxide, calcium carbonate. Buffering is important when acids are present. Certain acids can be used in the treatment of different types of chromium waste. Metallic iron can be used when a fast treatment is needed but not long term or permanent.

Lead soluble in acids

Arsenate $Pb(AsO_4)_2$

Arsenite $Pb(AsO_2)_2$

Borate $Pb(BO_2)_2$

Carbonate $(PbCO_3)$

Lead soluble in water

Antimonate $Pb_3(SbO_4)_2$

Formate $Pb(CHO_2)_2$

Nitrate $Pb(NO_3)_2$

Chloride $Pb\ Cl_2$

A fourth element has also been found to be beneficial in combination with the buffering agent. This element is preferably selected from the group consisting of ammonium phosphate, diammonium phosphate, phosphoric acid, boric acid, metallic iron and are desirable in combination with the buffering agents are used for different types of offending elements in the waste stream. For example, lead can be found in many forms that are soluble in water and soluble in acids. Just a few examples below.

What the process accomplishes is the chemical agents fix the waste by solidifying the, offending waste and making the offending elements immobile. The offending elements are thus bound into a form resistant to leaching. This binding effect is accomplished by tieing the offending elements, e.g., into a strong matrix of the combined chemicals or by encapsulation of the offending elements in a solid mass. The effect of the process is to reduce the surface area exposed for the release of potentially hazardous elements from leaching into the environment.

Examples of the type of surface treatments used in removal process are normally categorized on the amount of offending metals in the waste. Generally, the wastes are categorized around the presence of lead in the waste. This hazardous element is usually formed in red lead primers used to paint steel structure. The amount of lead can range from as low as 2000 parts per million to as high as 350,000 parts per million. The amount of hazardous material in the waste is determinative as to whether the waste complies with the EPA regulation on the TCLP test.

While presently preferred embodiments are described, the invention may be otherwise embodied within the scope of the appended claims.

What is claimed is:

1. A method for removing a coating on a surface comprising the steps of:

(a) applying a treatment material to said coating to be removed to form a treatment layer, said treatment material comprising:

(i) a first compound comprising at least one compound selected from the group of compounds consisting of sodium and potassium silicates, sodium and potassium phosphate, calcium silicate, iron and aluminum sulfates, and (ii) an alkali metal salt; and (b) enjecting an abrasive onto said treatment layer and said coating to be removed to remove said coating and treatment layer.

2. A method as set forth in claim 1 including the step of collecting said coating, treatment material and abrasive.

3. A method as set forth in claim 1 wherein said treatment layer is applied to said coating in a thickness of from 1 to 40 mils.

4. A method as set forth in claim 1 wherein said treatment material has a viscosity of 75 to 640 stormer seconds.

5. A method as set forth in claim 1 wherein said treatment material includes a buffering agent.

6. A method as set forth in claim 2 including the step of separating said coating and treatment material from said abrasive.

7. A method as set forth in claim 6 wherein said separated coating and treatment material is disposed of without further treatment.

8. A method as set forth in claim 1 wherein said treatment material comprises at least one compound selected from the group consisting of:

| | |
|---|---|
| Sodium Silicate | Diammonium Phosphate |
| Sodium Metasilicate | Diacalcium Phosphate |
| Sodium Orthosilicate | Dipotassium Phosphate |
| Potassium Silicate | Tricalcium Phosphate |
| Aluminum Sulfate | Trisodium Phosphate |
| Alum | Sodium Metabisulfite |
| Ferrous Sulfate | Metallic Iron |
| Ferric Sulfate | Silicate of Soda |
| Tricalcium Silicate | Soda Ash (Sodium Carbonate) |
| Dicalcium Silicate | Caustic Potash (Potassium) |
| Tricalcium Aluminate | Hydroxide. |

9. A method as set forth in claim 1 wherein at least one compound of said treatment material is added with said abrasive prior to enjecting said abrasive against said coating to control any dust from said removal.

* * * * *